(12) United States Patent
Rose

(10) Patent No.: US 11,151,190 B2
(45) Date of Patent: *Oct. 19, 2021

(54) GENERATING PLAYLISTS USING CALENDAR, LOCATION AND EVENT DATA

(71) Applicant: Google LLC, Mountain View, CA (US)

(72) Inventor: Robert Brett Rose, Boulder, CO (US)

(73) Assignee: Google LLC, Mountain View, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/241,240

(22) Filed: Jan. 7, 2019

(65) Prior Publication Data
US 2019/0138548 A1    May 9, 2019

Related U.S. Application Data

(63) Continuation of application No. 13/951,017, filed on Jul. 25, 2013, now Pat. No. 10,176,179.

(51) Int. Cl.
| | | |
|---|---|---|
| *G06F 16/60* | (2019.01) | |
| *G06F 16/487* | (2019.01) | |
| *G06F 16/683* | (2019.01) | |
| *G06F 16/61* | (2019.01) | |
| *G06F 16/438* | (2019.01) | |
| *G06F 16/48* | (2019.01) | |

(52) U.S. Cl.
CPC .......... *G06F 16/60* (2019.01); *G06F 16/4387* (2019.01); *G06F 16/487* (2019.01); *G06F 16/489* (2019.01); *G06F 16/61* (2019.01); *G06F 16/683* (2019.01)

(58) Field of Classification Search
CPC ...... G06F 16/60; G06F 16/487; G06F 16/489; G06F 16/683; G06F 16/4387; G06F 16/61

USPC .............................................. 707/769; 84/601
See application file for complete search history.

(56) References Cited

U.S. PATENT DOCUMENTS

| | | |
|---|---|---|
| 6,993,532 B1 | 1/2006 | Platt et al. |
| 2003/0028505 A1 | 2/2003 | O'Rourke et al. |
| 2003/0182315 A1 | 9/2003 | Plastina et al. |
| 2007/0220552 A1 | 9/2007 | Juster et al. |
| 2008/0133593 A1 | 6/2008 | Clark |
| 2008/0319833 A1 | 12/2008 | Svendsen |
| 2009/0006542 A1 | 1/2009 | Feldman et al. |

(Continued)

OTHER PUBLICATIONS

Anonymous, "XSPF ("spiff")", last updated Mar. 8, 2013, pp. 1-3, available at: https://web.archive.org/web/2013030818342/http://xspf.org/quickstart/, last accessed Jan. 2, 2019.

(Continued)

*Primary Examiner* — Robert W Beausoliel, Jr.
*Assistant Examiner* — Pedro J Santos
(74) *Attorney, Agent, or Firm* — Byrne Poh LLP

(57) ABSTRACT

A system and method of generating a playlist includes searching an event database having multiple events stored therein. One of the events is identified as corresponding to a user's interest data. A song database is searched. The song database includes at least one song corresponding to the identified event. A playlist corresponding to the identified event is generated. The playlist includes a list of at least one song corresponding to the identified event and a logical link to a recording of the at least one song. Access to the playlist can then be provided to the user.

21 Claims, 7 Drawing Sheets

(56) References Cited

U.S. PATENT DOCUMENTS

| | | |
|---|---|---|
| 2009/0156182 A1* | 6/2009 | Jenkins ............... H04M 3/4878 |
| | | 455/414.2 |
| 2009/0319370 A1 | 12/2009 | Jain |
| 2010/0146055 A1 | 6/2010 | Hannuksela |
| 2011/0022471 A1 | 1/2011 | Brueck et al. |
| 2012/0109345 A1 | 5/2012 | Gilliland |
| 2012/0109971 A1 | 5/2012 | Jellison, Jr. |
| 2012/0191510 A1 | 7/2012 | Cameron |
| 2012/0304064 A1 | 11/2012 | Delaney, Jr. |
| 2013/0151377 A1 | 6/2013 | Gudmundsson et al. |
| 2014/0229465 A1 | 8/2014 | Rose |
| 2014/0244607 A1 | 8/2014 | Hedinsson et al. |

OTHER PUBLICATIONS

International Search Report and Written Opinion dated Nov. 18, 2014 in International Patent Application No. PCT/US2014/044019.
Notice of Allowance dated Sep. 5, 2018 in U.S. Appl. No. 13/951,017.
Office Action dated Jan. 26, 2017 in U.S. Appl. No. 13/951,017.
Office Action dated Mar. 30, 2018 in U.S. Appl. No. 13/951,017.
Office Action dated May 13, 2015 in U.S. Appl. No. 13/951,017.
Office Action dated Jul. 27, 2017 in U.S. Appl. No. 13/951,017.
Office Action dated Nov. 24, 2017 in U.S. Appl. No. 13/951,017.
Office Action dated Dec. 3, 2015 in U.S. Appl. No. 13/951,017.

\* cited by examiner

GENERATING PLAYLISTS USING CALENDAR, LOCATION AND EVENT DATA

CROSS-REFERENCE TO RELATED APPLICATION

This application is a continuation of U.S. patent application Ser. No. 13/951,017, filed Jul. 25, 2013, which is hereby incorporated by reference herein in its entirety.

BACKGROUND

The present disclosure relates generally to generating playlists.

The playlists are typically, manually compiled by the user or by some other person within or for the playlist service.

SUMMARY

Broadly speaking, a system and method for automatically generating playlists reflecting a user's proximity in location and time and event interests is disclosed. It should be appreciated that the present concepts and ideas can be implemented in numerous ways, including as a process, an apparatus, a system, computer readable media, or a device. Several inventive embodiments are described below.

One embodiment provides a method of generating a playlist includes searching an event database having multiple events stored therein. One of the events is identified as corresponding to a user's interest data. A media content database is searched to identify content media such as songs and video played or scheduled to be played at the identified event. The media content database includes at least one content media such as a song or a video recording corresponding to the identified event. A playlist corresponding to the identified event is generated. The playlist includes a list of at least one media content corresponding to the identified event and a logical link to access the at least one media content. The logical link can be to a portion of the media content or a complete file of the at media content. Access to the playlist can then be provided to the user's device in the form of display data to present the playlist on a graphical user interface managed by the music vendor.

The events in the events database can include events occurring within a selected time period and/or geographically proximate to the user. The user's interest data can include the user's calendar entries, the user's purchase history, the user's Internet search query, the user's Internet browsing history and/or the user's social network content. The playlist can also be arranged in an order corresponding to the user's interest data.

Another embodiment provides a system for automatically generating a playlist corresponding to a selected past or future concert event. The system includes a server including a processor, a memory system, a collection of user interest data embodied in computer readable media, a music content including a plurality of music recordings embodied in computer readable media and a playlist logic embodied in computer readable media. The playlist logic includes logic for searching an event database and logic for identifying the selected concert event from the event database. The identified concert event corresponds to the user's interest data. The playlist logic also includes logic for searching a song database. The song database having at least one song corresponding to the identified concert event and logic for generating the playlist corresponding to the identified concert event. The playlist includes a list of at least one song corresponding to the identified concert event and a logical link to access an audio clip or a complete audio file of the song. Access to the playlist can be provided via a network. The network providing a data link to a user client playlist application.

The server can also include logic for determining if the user possesses access rights to a selected song included in the playlist and purchasing logic for offering to sell access rights to the selected song when the user did not possess access rights to the selected song. The server can be included on one or more of a plurality of cloud servers.

Other aspects and advantages will become apparent from the following detailed description, taken in conjunction with the accompanying drawings.

BRIEF DESCRIPTION OF THE DRAWINGS

The present disclosure will be readily understood by the following detailed description in conjunction with the accompanying drawings.

DETAILED DESCRIPTION

Several example embodiments for systems and methods for automatically generating playlists reflecting a user's proximity in location and time and event interests will now be described. It will be apparent to those skilled in the art that the present disclosure may be practiced without some or all of the specific details set forth herein.

Users are always seeking new music, video or other media content to listen to/view or "old" or previously known music, video or other media content to enjoy to in a new way. By way of example, when a concert or other event is in town or when a user is planning to attend an event, the user will often want to hear the music, e.g., songs, authors, performers, bands, etc. scheduled to be played at the event before and after the event.

While the following embodiments are described in terms of music and songs, it should be noted that the video and other digital media content can be the subject of the playlist as well as music and audio files.

Identifying the songs to be played at a single-act event is a relatively simple task. However, the process of selecting relevant music becomes very complex with multi-act event or a multi-day event with many acts each day or a single-act event that includes an unknown opening band. Manually finding and the songs to add to a corresponding playlist can be time consuming, tedious and even difficult at times. As a result, many users will not even try to customize a playlist or even attempt to find the songs of acts they have never heard of that are included as part of an event.

A music vendor constantly strives to introduce users to new music so as to entice the user to purchase more music content. Once the music vendor has a user listening to music, it is much easier to get the user to purchase additional music and try new music that might be interesting to the user. One aspect that may pique a user's interest is to arrange the user's playlist to correspond to an upcoming event. Such as playlist can be even more enticing if the user has indicated an interest in the upcoming event such as web searches about the event, ticket purchases for the event, participation in social networking related to the event, on-line discussions relating to the event such as in email, blogging or social networking or similar online content.

The disclosed system, method and apparatus can automatically generate recommendations and playlists from upcoming events that are customized for the user. Automatically creating recommendations and playlists corresponding to events can solve many problems for the user as well as provide additional sales opportunities for the music vendor.

Figure 1A:
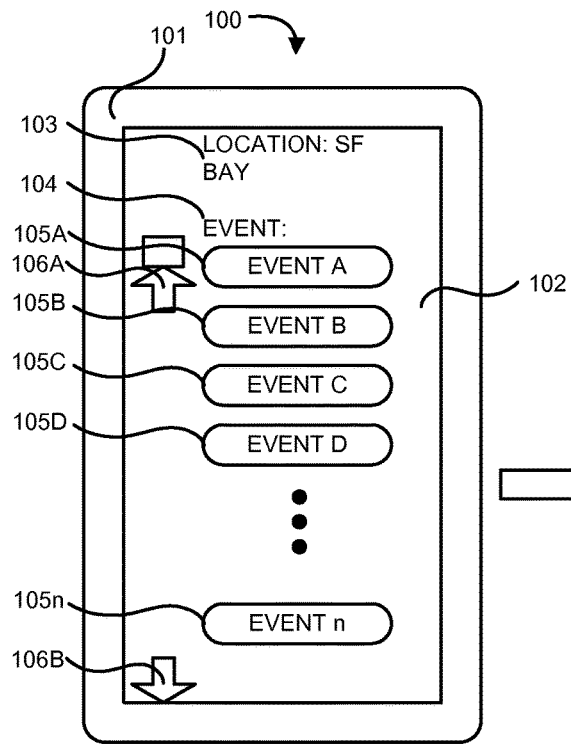
FIGS. 1A-D illustrate a playlist system, in accordance with embodiments of the present disclosure.

FIGS. 1A-D illustrate a playlist system 100, in accordance with embodiments of the present disclosure. The playlist system 100 allows a user to manually indicate and/or access interest in and information about particular events and/or song. The playlist system 100 can be presented on any type of user device 101. A user device 101, such as a smartphone or tablet computer, is shown as an example embodiment, however, it should be understood that any suitable device could be used, such as a computer. As shown in FIG. 1A, the playlist system 100 can include a playlist locale 103 and a list of events 105A-105n. Scroll arrows 106A-B can be used to scroll through the list of events 105A-105n.

By way of example, in large metro-areas such as San Francisco, Calif. or Chicago, Ill. or New York, N.Y. might have hundreds of events occurring within a selected time period, e.g., a 30 day time period. Upcoming events geographically near the user can be compiled using a combination of manual entry, web-search history by the user, user's calendar entries, user's email, blogging or other electronic communications, user's interests and discussions content on social media, and even sponsored or placed events collected from one or more of the vendor's partners.

Once a playlist of songs is identified, the playlist can be presented to the user as potential interest points. The user can select performers of interest or not of interest or select an entire event, or other subset of selections related to the event. A user might be very interested in a larger event, even if the event is not local and there is no data indicating the user's planning to attend the event. By way of example, for a larger or well-known event like Bonnaroo or Telluride Bluegrass Festival, the choices could be presented to a user in a separate list, regardless of the user's location. Once the interest has been identified, the system and method can then present suggested songs that are part of those events or related to those events, to the user.

Figure 1B:
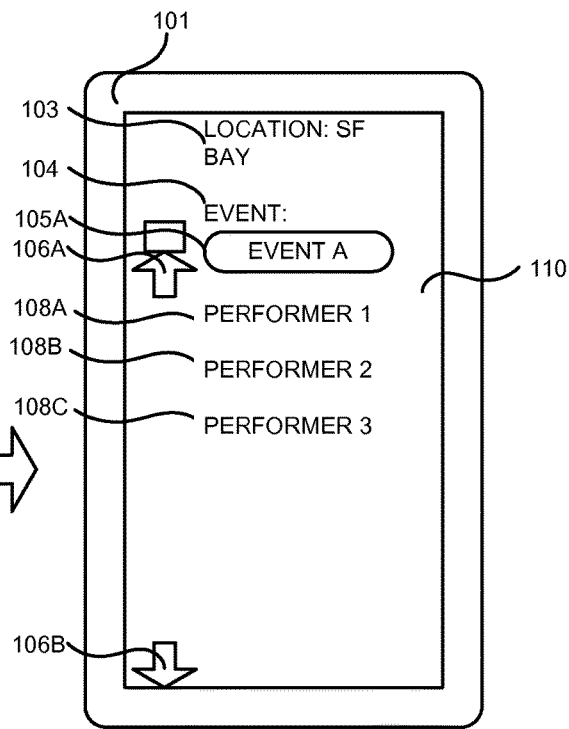

Selecting an event, e.g., Event A 105A, causes an events page 110 to be displayed as shown in FIG. 1B. The events page 110 includes the event and a list of performers 108A-C for the selected event, e.g., Event A 105A.

Figure 1C:
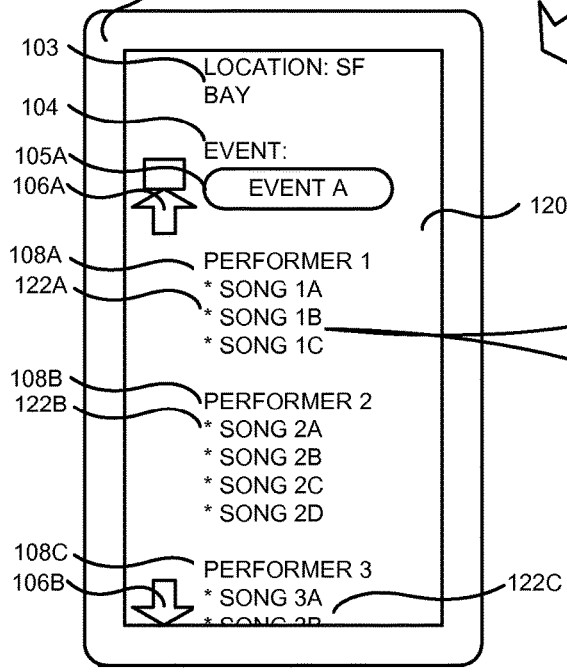
Figure 1D:
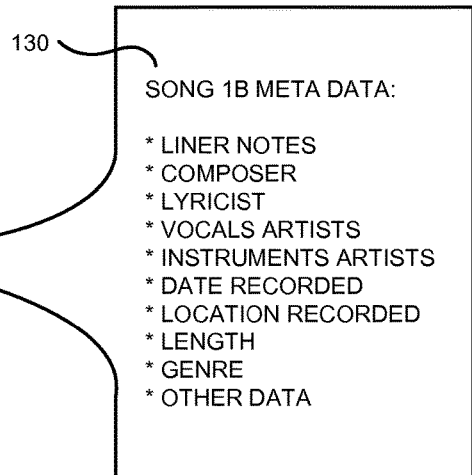

Selecting one of the performers 108A-C can cause a detail page 120 to be displayed, as shown in FIG. 1C. The detail page 120 can include lists of the performers' songs 122A-C. Each of the songs can include the respective metadata for the song as shown in FIG. 1D.

Figure 2:
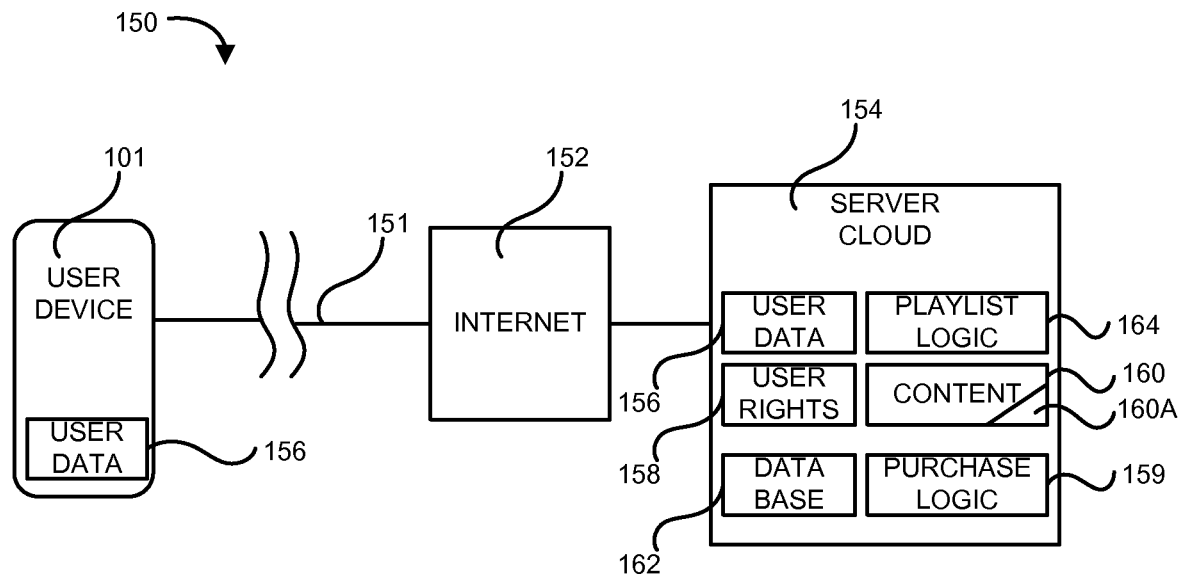
FIG. 2 is a simplified block diagram of a playlist generation system, in accordance with embodiments of the present disclosure.

FIG. 2 is a simplified block diagram of a playlist generation system 150, in accordance with embodiments of the present disclosure. The user device 101 is linked by a data network 151 to the Internet 152, and/or a server such as included in a server cloud 154. The data network 151 can be any type of data network such as wired or wireless network systems and protocols.

All or portions of a user's interest data 156 can be stored in one or more locations such as on the user device 101 and/or on one or more servers in the server cloud 154. The server cloud 154 also includes a playlist logic 164 for automatically generating playlists for the user.

The server cloud 154 can also include the content 160, e.g., music, video or other content media, controlled by the vendor. The server cloud 154 can also include content 160A owned by the user such as content the user has purchased and stored in an online content locker to provide access to the user's content, independent of the user device 101. The server cloud 154 can also include a database 162 related to the media content. The database 162 can include data related to the content such as events, artists, performers, musicians and many more data fields for each data base entry.

Figure 3:
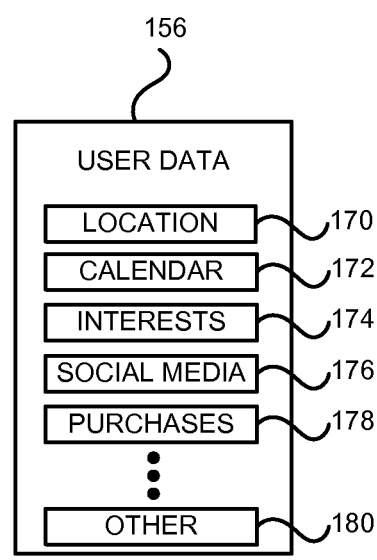
FIG. 3 is a simplified block diagram of a user's data types, in accordance with embodiments of the present disclosure.

FIG. 3 is a simplified block diagram of types of a user's interest data 156, in accordance with embodiments of the present disclosure. The user's events page 110 and detail page 120 can be customized for the user. The customization can include a ranking process base on the user's interest data 156. The user's interest data 156 can include the user's location 170, calendar data 172, expressed interests 174 including internet search and browsing history, social media posts 176, past purchases 178 and other user data 180.

User's expressed interests 174 can also include media "likes" and media "dislikes." By way of example, if a user indicates he likes, promotes or shares a particular song in a playback client application or in a social networking discussion or otherwise, then that song may be given an elevated interest rating for that user. Similarly, if a user indicates he dislikes or disapproves a particular song in a playback client application or in a social networking discussion or otherwise, then that song may be given a reduced interest rating for that user.

Figure 4:
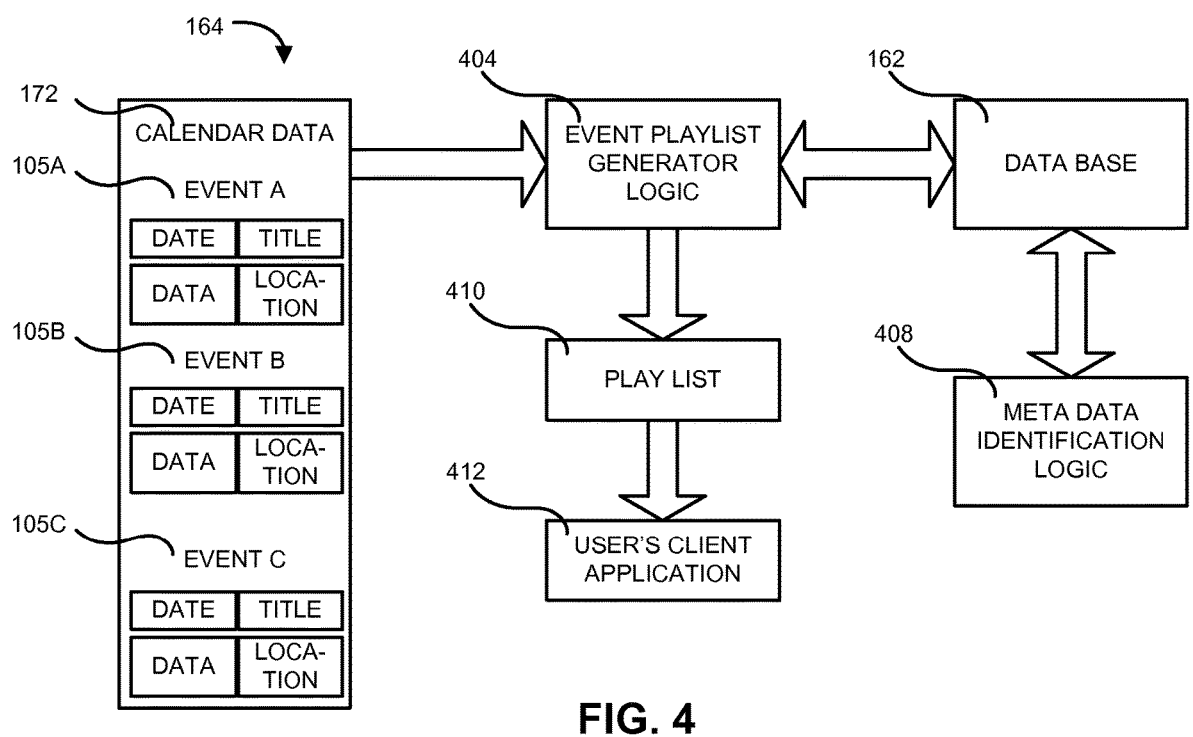
FIG. 4 is a block diagram of the logic processes within the playlist logic, in accordance with embodiments of the present disclosure.

FIG. 4 is a block diagram of the logic processes within the playlist logic 164, in accordance with embodiments of the present disclosure. The playlist logic 164 culls data from one or more sources to identify events of the user's interest. As an example, the user's calendar data 172 can be one source. Searching the Internet for events can be another source. Each of the event data 105A-C entries can include date, title, location and additional related data.

Another source of events of the user's interest could include events promoted by the music vendor. By way of example, the music vendor may want to promote an upcoming event to their users to spur sales of related media content to their users. The media vendor may focus the promotion of the event on selected users or broadly on all or a wide variety of users and even beyond their user base so as to attract new users. By way of example, the vendor may use an event having a broad audience following among their users and many potential users such as the National Football League Superbowl. The Superbowl half-time show attracts attention from a very large audience. The vendor may produce a playlist to increase the interest level of songs and video of the half-time show.

When an event of interest is identified, such as manually identified by a user or automatically identified based on the user interest data as described above, the playlist logic 164 can use the data base 162 to identify the songs, performers, etc., scheduled to play in the identified event. As an example, an internet site for the identified event can be queried and matching band names can be compared to a database of known bands and performers so as to include all bands and performers associated with the identified event of interest.

The event playlist generator logic 404 can use the identified events 105A-C as a starting point to lead to related data in one or more data bases 162. The metadata identification logic 408 can use the metadata 130 of each content entry to identify particular content. By way of example, the data base 162 may identify a song, however, multiple different recordings of the same the song may stored in the content 160. The different recordings may include several different performers performing the same song or alternatively or additionally, the content 160 may include one or more performers performing the same song in different formats, e.g., live, studio master, acoustic, etc. The meta data identification logic 408 can use the meta data 130 to identify the best match for the particular recording of the song for the user's playlist. The event playlist generator logic 404 can then generate a playlist 410. The generated playlist is available to be forwarded to or accessed by the user device 101.

The playlist could present the music organized by the event, so it would play like a possible setlist or "best of". Songs could be organized within the playlist according to the user's interest data, a popularity ranking or most listened to ranking from the user's playlist history e.g., in a corresponding music vendor's knowledge base, and combinations thereof.

For multi-act events, song lists could be organized by performer so a user could get the feel of what the concert might be like. Using the annual Coachella Valley Music Festival event as an example, the user can listen to a Coachella playlist for the event, whether a future event or past event. The song selections in the playlist can be suggested to the user to purchase music that they might be seeing at the event.

The system can similarly examine past events, thus allowing a user returning from an event and perform the same functionality. By way of example, a user could query events from August 1969 and be presented with selections or setlists of music performed at the famed Woodstock Music Festival in Bethel, N.Y. The individual performers and their respective setlists of songs can be correlated.

Figure 5:
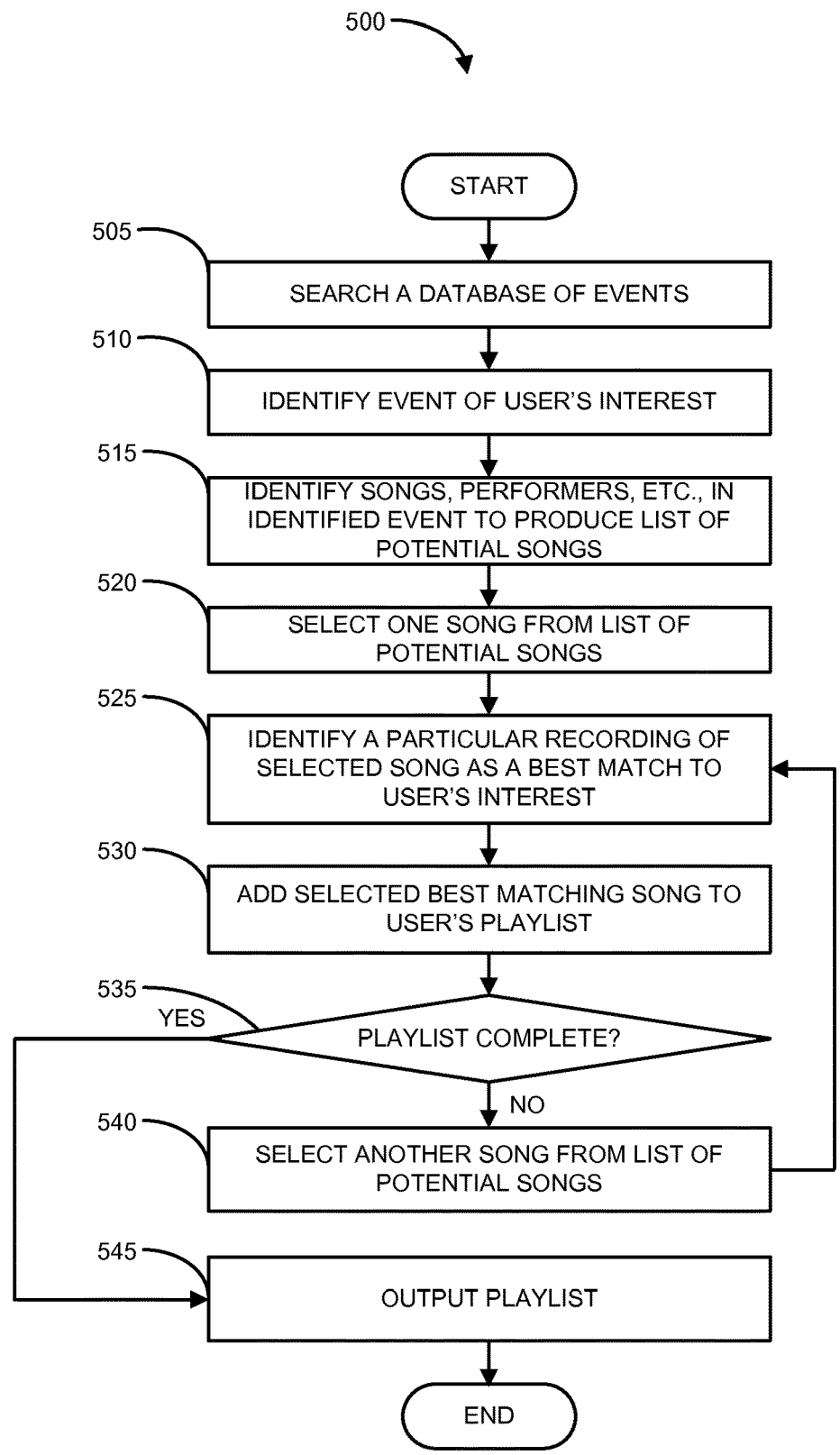
FIG. 5 is a flowchart diagram that illustrates the method operations performed in automatically generating a playlist from an event, in accordance with embodiments of the present disclosure.

FIG. 5 is a flowchart diagram that illustrates the method operations 500 performed in automatically generating a playlist from an event, in accordance with embodiments of the present disclosure. In an operation 505, the playlist logic 164 searches data from many sources, e.g., databases such as database 162, to identify events of the user's interest. The user's calendar data 172 can be one source. Searching the internet for events can be another source. Each of the event data 105A-C entries can include date, title, location and additional related data. In an operation 510, the playlist logic 164 identifies an event of the user's interest.

In an operation 515, the playlist logic 164 uses the data base 162 to identify the songs, performers, etc., scheduled to play in the identified event to produce a list of potential songs to be performed at the identified event. The list of potential songs to be performed at the identified event can also include related songs that may be of interest to the user. The related songs can include different versions of songs performed by the identified performers already included in the list of potential songs. The related songs can also include different versions of songs already included in the list of potential songs that are performed by performers other than the identified performers. The related songs can also include other songs performed by the identified performers but not previously included in the list of potential songs to be performed at the identified event.

In an operation 520, the metadata identification logic 408 selects one of the songs from the list of potential songs. In an operation 525, the metadata identification logic 408 uses the metadata 130 corresponding to the selected song to identify a best match for the particular recording of the song for the user's playlist. The best matching song correlates to the user's interest.

In an operation 530, the event playlist generator logic 404 adds the selected best matching song to a playlist 410. In an operation 535, the playlist 410 is reviewed to determine if the playlist is complete. If the playlist 410 is not complete, the method operations continue in an operation 540. In operation 540, the playlist logic 164 selects another song from the songs from the list of potential songs and the method operations continue in operation 525 above.

If the playlist 410 is complete, then the method operations continue in an operation 545. In operation 545, the generated playlist is output such as forwarded to or otherwise made accessible by the user device 101 and the method operations can end.

By way of example, the playlist 410 can be presented as a graphical user interface display data, e.g., a webpage or similar GUI display, to the user's device 101. The playlist webpage display on the user's device 101 includes logical links such as hyperlinks, to the functional code and data stored on and managed by the music vendor's server 154.

Each song listed on the playlist 410 can be a logical link to access an audio clip of the corresponding song. The audio clip can be stored in the content 160 on the server 154. Alternatively, or additionally, each song listed on the playlist 410 can be a logical link to access a complete audio file of the corresponding song. The audio file can be stored in the content 160 on the server 154.

Figure 6A:
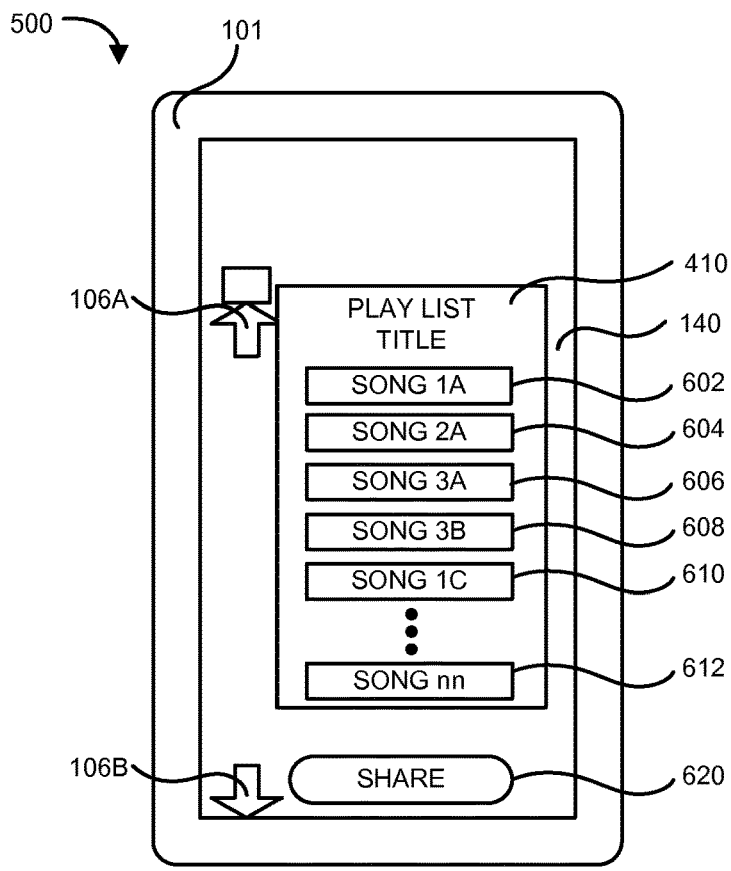
FIG. 6A is a playback client application user interface, in accordance with embodiments of the present disclosure.

FIG. 6A is a playback client application user interface 600, in accordance with embodiments of the present disclosure. The playback client application user interface 600 is displayed on the user device 101 and includes a display of the playlist 410. The playlist 410 includes songs 1A-nn 602-612.

The playback client application user interface 600 can also include a share button 620. The share button 620 allows the user to share the playlist 410 via social networking or other sharing system. Selecting the share button 620 causes the playlist 410 to be submitted to the user's social network provider. The user's social network provider can share the playlist 410 according to the user's social networking preferences.

Figure 6B:
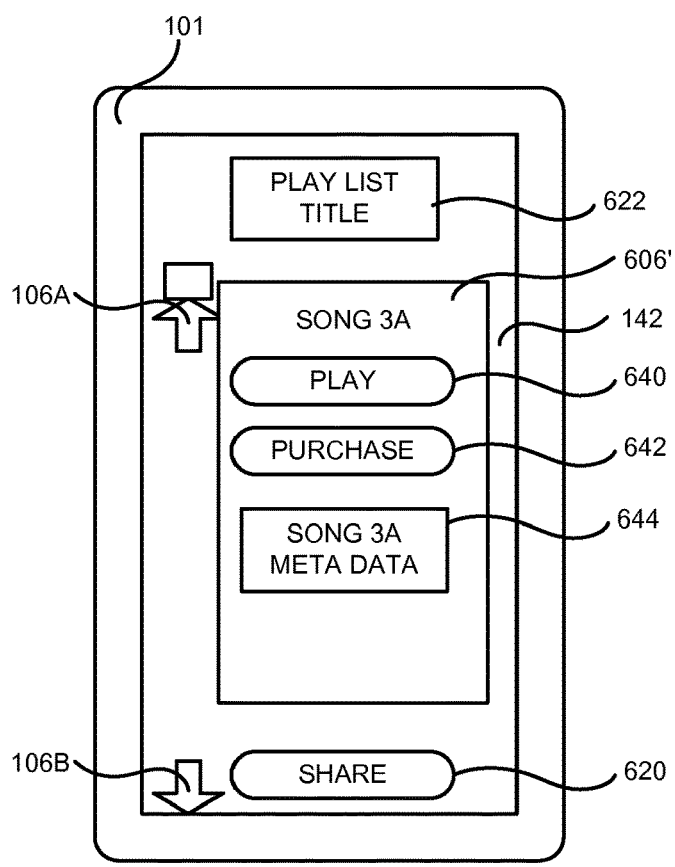
FIG. 6B is an options screen display in the playback client application user interface, in accordance with embodiments of the present disclosure.

FIG. 6B is an options screen display in the playback client application user interface 600, in accordance with embodiments of the present disclosure. Selecting a song such as Song 3A 606, displays an options screen 142 listing the access options available for the selected song. The options screen 142 can include a play button 640 that may be selected to play the selected song. When the play button 640 is selected, the playlist logic interrogates a user rights database 158 to determine if the user has previously purchased the rights to use the selected recording of the selected song.

By way of example the user may have previously purchased the rights to play the selected recording of the selected song and have the selected recording of the selected song stored in the user's content locker or on his user device. Alternatively, the user may have purchased rights to access the selected recording of the selected song from the content database 160 provided by the music vendor. If the user has rights to play the selected recording of the selected song, the selected song 3A 606 can be streamed or downloaded to the user device 101.

If the user does not have rights to play the selected recording of the selected song 3A 606, then the play button 640 may not be displayed or may be disabled and a purchase button 642 can be enabled or displayed. The purchase button 642 activates a content purchase logic 159 to allow the user to purchase rights to the selected recording of the selected song 3A 606. The content purchase logic 159 can also include a sampling option to allow a user to access a sample portion of the selected recording of the selected song 3A 606 to assist in the user's purchasing decision.

The options screen 142 can also include a meta data button 644 to allow the user to access at least a portion of the meta data corresponding to the selected recording of the selected song 3A 606 to assist in the user's purchasing decision or to provide additional information about the selected recording of the selected song 3A to the user.

Figure 7A:
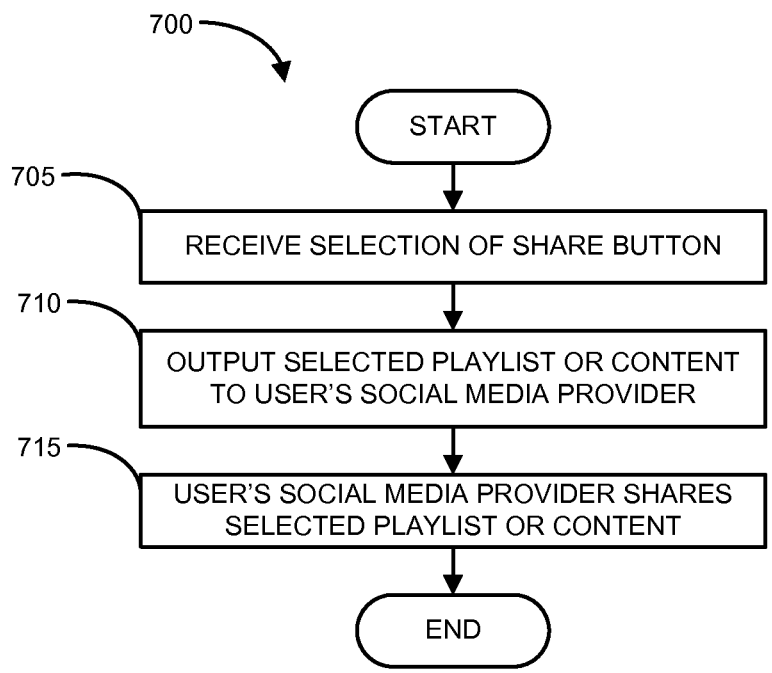
FIG. 7A is a flowchart diagram that illustrates the method operations performed in sharing a playlist from an event, in accordance with embodiments of the present disclosure.

FIG. 7A is a flowchart diagram that illustrates the method operations 700 performed in sharing a playlist from an event, in accordance with embodiments of the present disclosure. In an operation 705, the user can select the share button 620 to share the playlist or a selected song and the selection of the share button is received in the playlist logic 164. The playlist logic 164 downloads or otherwise provides access to the playlist to the user's social media provider in an operation 715 and the method operations can end.

Figure 7B:
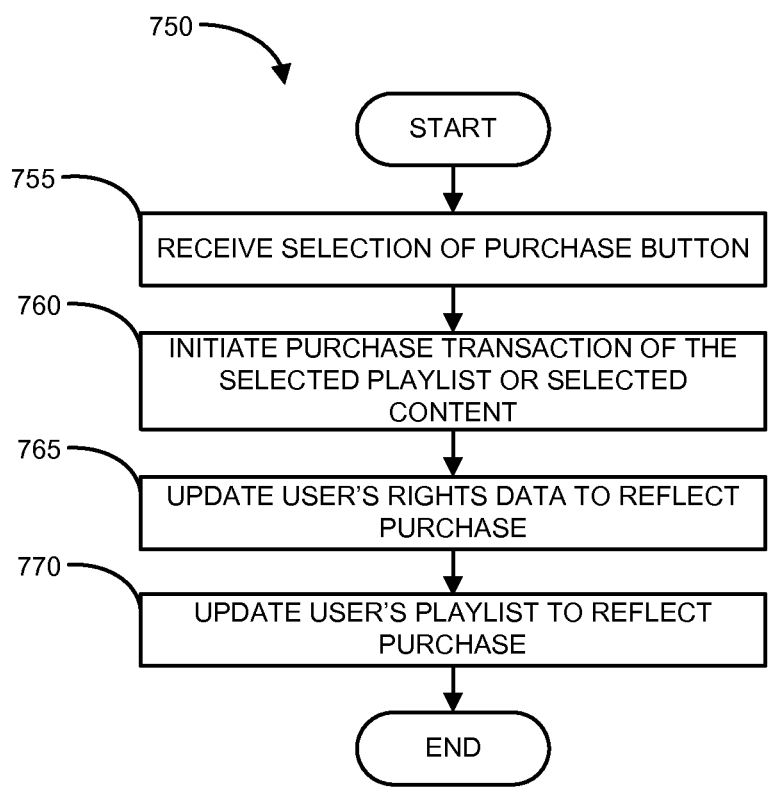
FIG. 7B is a flowchart diagram that illustrates the method operations performed in purchasing content from an event, in accordance with embodiments of the present disclosure.

FIG. 7B is a flowchart diagram that illustrates the method operations 750 performed in purchasing content from an event, in accordance with embodiments of the present disclosure. In an operation 755, the user can select the purchase button 642 to purchase the selected song and the selection of the purchase button 642 is received in the purchase logic 159. The purchase logic 159 initiates a purchase transaction with the user according to the user's account preferences in the music vendor's service, in an operation 760. Initiating the purchase transaction can also, optionally, include providing an option for the user to access a sample of the selected song. Providing access to the sample of the selected song allows the user to preview the song before purchase to make sure the selected song is the correct song the user wishes to purchase. The user can also access the selected song's metadata by selecting the metadata button 644 to make sure the selected song is the correct song the user wishes to purchase.

When the purchase is completed, the user's rights data 158 are updated to reflect the purchase, in an operation 765. Completing the purchase also updates the user's playlist so that the play button 640 can be enabled in an operation 770 and the method operations can end.

Figure 8:
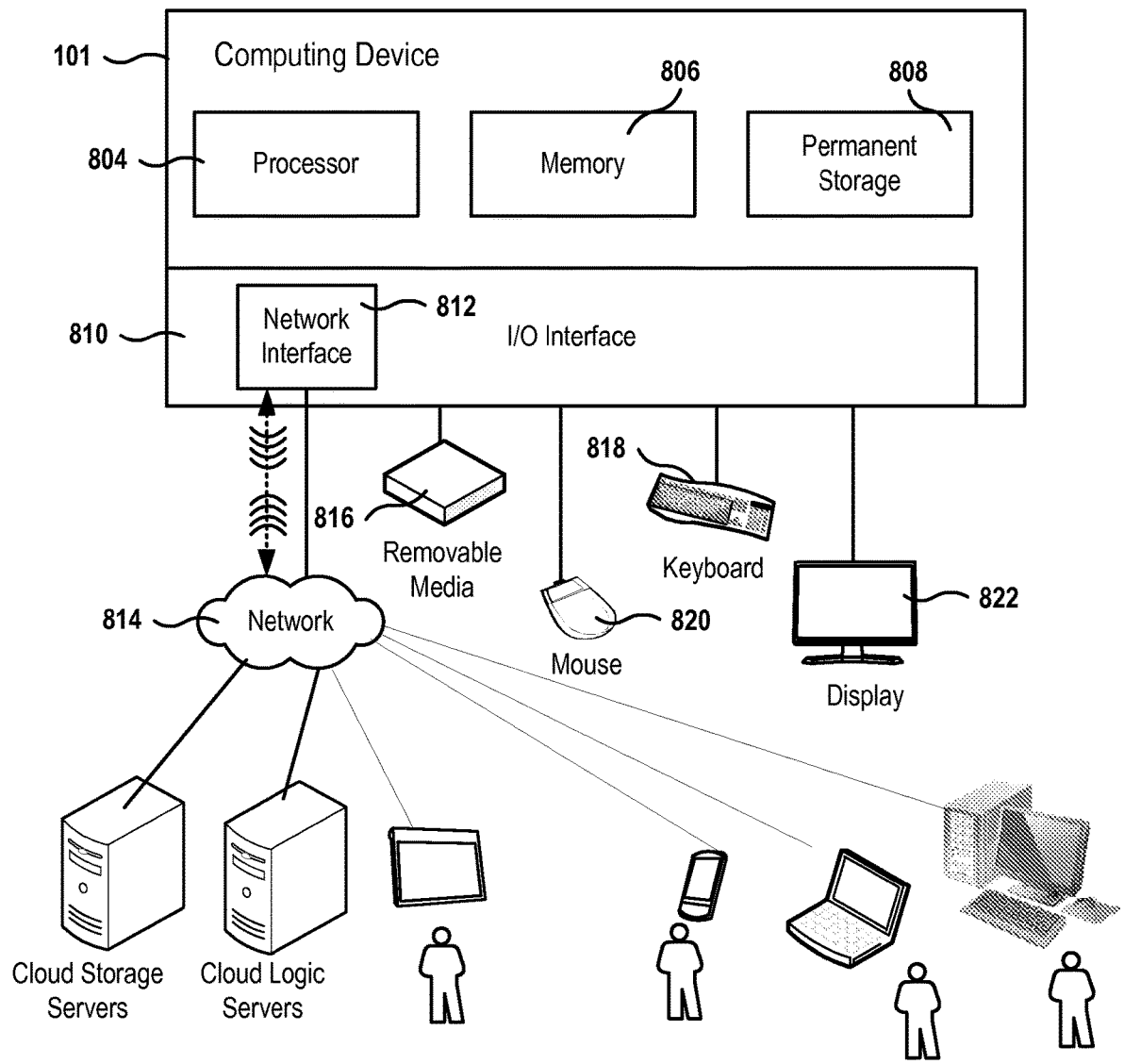
FIG. 8 is a simplified schematic diagram of a computer system for implementing embodiments of the present disclosure.

FIG. 8 is a simplified schematic diagram of a computer system 802 for implementing embodiments of the present disclosure. FIG. 8 depicts an example computer environment for implementing embodiments of the disclosure. It should be appreciated that the methods described herein may be performed with a digital processing system, e.g., a conventional, general-purpose computer system. Special purpose computers, which are designed or programmed to perform only one function, may be used in the alternative. The computer system 802 includes a processor 804, which is coupled through a bus to memory 806, permanent storage 808, and Input/Output (I/O) interface 810.

Permanent storage 808 represents a persistent data storage device e.g., a hard drive or a USB drive, which may be local or remote. Network interface 812 provides connections via network 814, allowing communications (wired or wireless) with other devices. It should be appreciated that processor 804 may be embodied in a general-purpose processor, a special purpose processor, or a specially programmed logic device. Input/Output (I/O) interface 810 provides communication with different peripherals and is connected with processor 804, memory 806, and permanent storage 808, through the bus. Sample peripherals include display 822, keyboard 818, mouse 820, removable media device 816, etc.

Display 822 is configured to display the user interfaces described herein. Keyboard 818, mouse 820, removable media device 816, and other peripherals are coupled to I/O interface 810 in order to exchange information with processor 804. It should be appreciated that data to and from external devices may be communicated through I/O interface 810. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 808, network attached storage (NAS), read-only memory or random-access memory in memory module 806, Compact Discs (CD), Blu-ray™ discs, flash drives, hard drives, magnetic tapes, and other data storage devices. The non-transitory computer readable storage medium may be distributed over a network coupled computer system so that the computer readable code is stored and executed in a distributed fashion.

Additionally, FIG. 8 shows various types of devices that can connect to the network, e.g., the Internet. The devices include servers, tablet computers, smartphones, laptops, desktops, etc. The various devices and run operating systems and the operating systems can vary from manufacturer to manufacturer.

Some, or all operations of the method presented herein are executed through a processor, e.g., processor 804 of FIG. 8. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

Audio-fingerprinting techniques use low-level features that attempt to compactly describe the audio signal without assigning higher-level meaning to the features. In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

It will be further appreciated that the instructions represented by the operations in the above figures are not required to be performed in the order illustrated, and that all the processing represented by the operations may not be necessary to practice the disclosure. Further, the processes described in any of the above figures can also be implemented in software stored in any one of or combinations of the RAM, the ROM, or the hard disk drive.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the concepts and ideas are not to be limited to the details given herein, but may be modified within the scope and equivalents of the appended claims.

What is claimed is:

1. A method for automatically generating playlists, the method comprising:
   determining, using a hardware processor, interest data associated with a user of a user device, wherein the interest data comprises location information;
   identifying, using the hardware processor, an event that is geographically proximate to the user of the user device from a plurality of events based on location information;
   identifying, using the hardware processor, a plurality of media content items corresponding to the identified event;
   selecting, using the hardware processor, at least a subset of media content items from the plurality of media content items by correlating metadata associated with the subset of media content items with the interest data associated with the user of the user device;
   generating, using the hardware processor, a playlist that includes logical links to the subset of media content items; and
   providing, using the hardware processor, access to the playlist to the user device.

2. The method of claim 1, further comprising:
   searching a content database having a plurality of media content items corresponding to the identified event; and
   identifying different versions of a media content item of the plurality of media content items corresponding to the identified event.

3. The method of claim 2, further comprising selecting a version of the media content item from among the different versions of the media content item, wherein providing access to the playlist includes providing a logical link to the selected version of the media content item.

4. The method of claim 1, wherein providing access to the playlist includes providing access to a complete file of each media content item in the subset of media content items and determining if the user possesses access rights to each media content item.

5. The method of claim 1, wherein providing access to the playlist includes providing an offer to purchase a media content item in the subset of media content items in response to determining that the user does not possess access rights to the media content item.

6. The method of claim 1, wherein providing access to the playlist includes providing access to a portion of a media content item in the subset of media content items in response to determining that the user does not possess access rights to the media content item.

7. The method of claim 1, wherein providing access to the playlist includes providing access to the metadata of each media content item in the subset of media content items.

8. The method of claim 1, further comprising searching an event database having a plurality of events, wherein the plurality of events includes events occurring within a selected time period.

9. The method of claim 1, wherein generating the playlist further comprises arranging the playlist in an order based on the interest data.

10. The method of claim 1, wherein the event is a concert event that is geographically proximate to the user from a plurality of concert events based on the location information automatically without requiring the user to manually specify or eliminate concert events.

11. A system for automatically generating playlists, the system comprising:
    a hardware processor that is configured to:
    determine interest data associated with a user of a user device, wherein the interest data comprises location information;
    identify an event that is geographically proximate to the user of the user device from a plurality of events based on location information;
    identify a plurality of media content items corresponding to the identified event;
    select at least a subset of media content items from the plurality of media content items by correlating metadata associated with the subset of media content items with the interest data associated with the user of the user device;
    generate a playlist that includes logical links to the subset of media content items; and
    provide access to the playlist to the user device.

12. The system of claim 11, wherein the hardware processor is further configured to:
    search a content database having a plurality of media content items corresponding to the identified event; and
    identify different versions of a media content item of the plurality of media content items corresponding to the identified event.

13. The system of claim 12, wherein the hardware processor is further configured to select a version of the media content item from among the different versions of the media content item, wherein providing access to the playlist includes providing a logical link to the selected version of the media content item.

14. The system of claim 11, wherein providing access to the playlist includes providing access to a complete file of each media content item in the subset of media content items and determining if the user possesses access rights to each media content item.

15. The system of claim 11, wherein providing access to the playlist includes providing an offer to purchase a media content item in the subset of media content items in response to determining that the user does not possess access rights to the media content item.

16. The system of claim 11, wherein providing access to the playlist includes providing access to a portion of a media content item in the subset of media content items in response to determining that the user does not possess access rights to the media content item.

17. The system of claim 11, wherein providing access to the playlist includes providing access to the metadata of each media content item in the subset of media content items.

18. The system of claim 11, wherein the hardware processor is further configured to search an event database having a plurality of events, wherein the plurality of events includes events occurring within a selected time period.

19. The system of claim 11, wherein generating the playlist further comprises arranging the playlist in an order based on the interest data.

20. The system of claim 11, wherein the event is a concert event that is geographically proximate to the user from a plurality of concert events based on the location information automatically without requiring the user to manually specify or eliminate concert events.

21. A non-transitory computer-readable medium containing computer executable instructions that, when executed by a processor, cause the processor to perform a method for automatically generating playlists, the method comprising:

determining interest data associated with a user of a user device, wherein the interest data comprises location information;

identifying an event that is geographically proximate to the user of the user device from a plurality of events based on location information;

identifying a plurality of media content items corresponding to the identified event;

selecting at least a subset of media content items from the plurality of media content items by correlating metadata associated with the subset of media content items with the interest data associated with the user of the user device;

generating a playlist that includes logical links to the subset of media content items; and providing access to the playlist to the user device.

\* \* \* \* \*